United States Patent
Binsirawanich et al.

(10) Patent No.: US 9,739,654 B2
(45) Date of Patent: *Aug. 22, 2017

(54) SYSTEM AND METHOD FOR MEASURING PRODUCT FLOW TO AN AGRICULTURAL IMPLEMENT

(71) Applicant: CNH Industrial Canada, Ltd., Saskatoon (CA)

(72) Inventors: Pana Binsirawanich, Saraburi (TH); Scott David Noble, Saskatoon (CA); Jim Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 82 days.

This patent is subject to a terminal disclaimer.

(21) Appl. No.: 14/296,093

(22) Filed: Jun. 4, 2014

(65) Prior Publication Data
US 2014/0283719 A1    Sep. 25, 2014

Related U.S. Application Data

(62) Division of application No. 13/229,220, filed on Sep. 9, 2011, now Pat. No. 8,746,158.

(51) Int. Cl.
*G01F 9/00* (2006.01)
*G01F 1/74* (2006.01)
*G01F 1/86* (2006.01)
*A01B 76/00* (2006.01)
(Continued)

(52) U.S. Cl.
CPC ............... *G01F 9/00* (2013.01); *A01B 76/00* (2013.01); *A01C 7/081* (2013.01); *A01C 7/102* (2013.01); *G01F 1/74* (2013.01); *G01F 1/86* (2013.01)

(58) Field of Classification Search
CPC ..... G01F 9/00; G01F 1/74; G01F 1/00; G01F 1/86; G01F 1/76; A01B 76/00; A01C 7/081; A01C 7/08; A01C 7/00; A01C 7/102; A01C 7/10
USPC ........ 406/12, 14, 30, 21, 33, 19, 34; 701/50, 701/1; 702/45; 111/200, 903, 904, 170, 111/174–176
See application file for complete search history.

(56) References Cited

U.S. PATENT DOCUMENTS

| | | |
|---|---|---|
| 5,831,539 A | 11/1998 | Thomas et al. |
| 5,831,542 A | 11/1998 | Thomas et al. |
| 5,996,515 A | 12/1999 | Gregor et al. |

(Continued)

*Primary Examiner* — Christopher J Novosad
(74) *Attorney, Agent, or Firm* — Rebecca L. Henkel; Rickard K. DeMille

(57) ABSTRACT

An agricultural implement system is provided including a fluid conduit configured to provide product to a ground engaging tool. The ground engaging tool is configured to deposit the product into soil. The agricultural implement system also includes an air source fluidly coupled to the fluid conduit, and configured to provide an air flow through the fluid conduit in a downstream direction toward the ground engaging tool. The agricultural implement system further includes a product delivery system fluidly coupled to the fluid conduit, and configured to transfer the product into the air flow. In addition, the agricultural implement system includes a product flow measurement system configured to determine a mass flow rate of the product based on a pressure drop between an upstream portion of the fluid conduit and a downstream portion of the fluid conduit, a flow rate of the air flow, and a velocity of the air flow.

10 Claims, 4 Drawing Sheets

(51) Int. Cl.
  *A01C 7/08* (2006.01)
  *A01C 7/10* (2006.01)

(56) References Cited

U.S. PATENT DOCUMENTS

| | | |
|---|---|---|
| 6,158,363 A | 12/2000 | Memory et al. |
| 6,176,647 B1 | 1/2001 | Itoh |
| 6,192,813 B1 | 2/2001 | Memory et al. |
| 6,296,425 B1 | 10/2001 | Memory et al. |
| 6,546,811 B2 | 4/2003 | Fincke |
| 6,655,221 B1 | 12/2003 | Aspelund et al. |
| 6,851,377 B2 | 2/2005 | Mayerle et al. |
| 6,957,586 B2 | 10/2005 | Sprague |
| 6,988,857 B2 | 1/2006 | Kroemmer et al. |
| 7,101,120 B2 | 9/2006 | Jurkovick |
| 7,316,110 B2 | 1/2008 | Schilling |
| 7,359,803 B2 | 4/2008 | Gysling et al. |
| 8,746,158 B2 * | 6/2014 | Binsirawanich .......... G01F 1/74 111/174 |
| 8,869,718 B2 * | 10/2014 | Binsirawanich ....... A01C 7/081 111/174 |
| 2003/0136175 A1 * | 7/2003 | Saikalis ............... G01N 33/225 73/23.2 |
| 2005/0246111 A1 | 11/2005 | Gysling et al. |
| 2010/0264163 A1 | 10/2010 | Tevs et al. |
| 2010/0326339 A1 | 12/2010 | Georgison et al. |
| 2011/0035163 A1 | 2/2011 | Landphair |
| 2012/0017699 A1 | 1/2012 | Loose et al. |
| 2012/0036914 A1 | 2/2012 | Landphair et al. |
| 2012/0055263 A1 | 3/2012 | Konzelmann |

\* cited by examiner

SYSTEM AND METHOD FOR MEASURING PRODUCT FLOW TO AN AGRICULTURAL IMPLEMENT

CROSS-REFERENCE TO RELATED APPLICATION

This application is a divisional of U.S. patent application Ser. No. 13/229,220, entitled "SYSTEM AND METHOD FOR MEASURING PRODUCT FLOW TO AN AGRICULTURAL IMPLEMENT", filed Sep. 9, 2011, which is herein incorporated by reference in its entirety.

BACKGROUND

The invention relates generally to a system and method for measuring product flow to an agricultural implement.

Generally, seeding implements are towed behind a tractor or other work vehicle via a hitch assembly secured to a rigid frame of a planter or seeder. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and deliver product (e.g., seed, fertilizer, etc.) to ground engaging tools within the seeding implement. Certain air carts include a metering system configured to deliver metered quantities of product into an airflow that transfers the product to the openers. To ensure that a desired quantity of product is delivered, a calibration procedure may be performed to calibrate rotation of meter rollers within the metering system to a mass flow rate of product to the openers. Some calibration procedures involve user intervention throughout the process. For example, a user may attach a bag to the metering system to collect expelled product. The user may then instruct the metering system to rotate the meter rollers through a desired number of rotations (e.g., 50 100, 150, 200, etc.). Next, the user may weigh the collected product and enter the weight into a user interface. A controller may then automatically compute a calibration that associates product mass flow rate with rotation of the meter rollers. Such user intervention may be time consuming, and may result in inaccurate calibrations, thereby causing too much or too little product to be delivered.

BRIEF DESCRIPTION

In one embodiment, an agricultural implement system includes a fluid conduit configured to provide product to a ground engaging tool. The ground engaging tool is configured to deposit the product into soil. The agricultural implement system also includes an air source fluidly coupled to the fluid conduit, and configured to provide an air flow through the fluid conduit in a downstream direction toward the ground engaging tool. The agricultural implement system further includes a product delivery system fluidly coupled to the fluid conduit, and configured to transfer the product into the air flow. In addition, the agricultural implement system includes a product flow measurement system configured to determine a mass flow rate of the product based on a pressure drop between an upstream portion of the fluid conduit and a downstream portion of the fluid conduit, a flow rate of the air flow, and a velocity of the air flow.

In another embodiment, a system for measuring product flow to an agricultural implement includes a first pressure sensor configured to output a first signal indicative of fluid pressure within an upstream portion of a fluid conduit. The fluid conduit is configured to convey product to the agricultural implement via an air flow in a downstream direction. The system also includes a second pressure sensor configured to output a second signal indicative of fluid pressure within a downstream portion of the fluid conduit. The system further includes an air flow sensor configured to output a third signal indicative of a flow rate of the air flow, and a fourth signal indicative of a velocity of the air flow. In addition, the system includes a controller communicatively coupled to the first pressure sensor, to the second pressure sensor, and to the air flow sensor. The controller is configured to determine a pressure drop between the upstream and downstream portions of the fluid conduit based on the first signal and the second signal. The controller is also configured to determine a mass flow rate of the product based on the pressure drop, the third signal and the fourth signal.

In a further embodiment, a method for measuring product flow to an agricultural implement includes measuring a pressure drop between an upstream portion of a fluid conduit and a downstream portion of the fluid conduit. The fluid conduit is configured to convey product to the agricultural implement via an air flow in a downstream direction. The method also includes measuring a flow rate of the air flow, and measuring a velocity of the air flow. In addition, the method includes determining a mass flow rate of the product based on the pressure drop, the flow rate of the air flow, and the velocity of the air flow.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
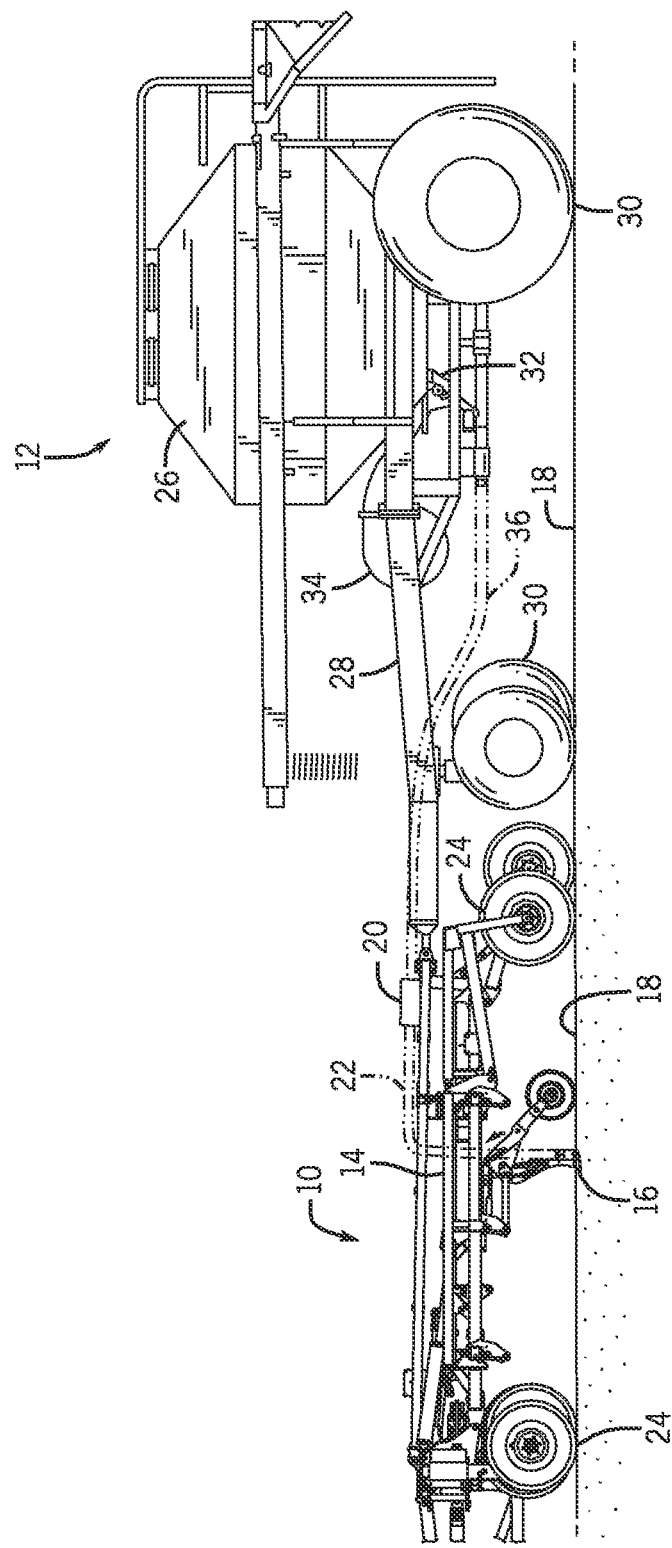
FIG. 1 is a side view of an exemplary air cart that may employ an embodiment of a product flow measurement system.

FIG. 1 is a side view of an air cart that may employ an embodiment of a product flow measurement system. In the illustrated embodiment, an implement 10 is coupled to an air cart 12, which is towed behind the implement 10 during operation and transport. The implement 10 includes a tool frame 14, and a ground engaging tool 16 coupled to the tool frame 14. The ground engaging tool 16 is configured to excavate a trench into the soil 18 to facilitate seed and/or fertilizer deposition. In the illustrated embodiment, the ground engaging tool 16 receives product (e.g., seed, fertilizer, etc.) from a product distribution header 20 via a hose 22 extending between the header 20 and the ground engaging tool 16. Although only one ground engaging tool 16, product distribution header 20, and hose 22 are employed within the illustrated embodiment, it should be appreciated that the implement 10 may include additional tools 16, headers 20 and/or hoses 22 in alternative embodiments to facilitate product delivery across a wide swath of soil 18. In addition, the implement 10 includes wheel assemblies 24 which contact the soil surface 18 and enable the implement 10 to be pulled by a tow vehicle.

While the air cart 12 is towed behind the implement 10 in the illustrated embodiment, it should be appreciated that the air cart 12 may be towed directly behind a tow vehicle in alternative embodiments. For example, the air cart may be coupled to the tow vehicle by a hitch assembly, and the implement 10 may be towed behind the air cart 12. In further embodiments, the implement 10 and the air cart 12 may be part of a single unit that is towed behind a tow vehicle, or elements of a self-propelled vehicle configured to distribute product across a field.

In the illustrated embodiment, the air cart 12 includes a storage tank 26, a frame 28, wheels 30, a metering system 32, and an air source 34. The frame 28 includes a towing hitch configured to couple to the implement 10 or tow vehicle, thereby enabling the air cart 12 to be towed across a field. In certain configurations, the storage tank 26 includes multiple compartments for storing various flowable particulate materials. For example, one compartment may include seeds, and another compartment may include a dry/granular fertilizer. In such configurations, the air cart 12 may be configured to deliver both seed and fertilizer to the implement 10 via separate distribution systems, or as a mixture through a single distribution system.

The seed and/or fertilizer within the storage tank 26 are gravity fed into the metering system 32, thereby enabling the metering system to distribute a desired quantity of product to the ground engaging tools 16 of the implement 10. In the present embodiment, the metering system 32 includes sectioned meter rollers to regulate the flow of product from the storage tank 26 into an air flow provided by the air source 34. The air flow then carries the product through a hose 36 to the implement 10, thereby supplying the ground engagement tools 16 with seed and/or fertilizer for deposition into the soil. Although only one hose 36 is included in the illustrated embodiment, additional hoses may be may be employed in alternative embodiments to transfer product from the air cart 12 to various distribution headers 20 of the implement 10.

As discussed in detail below, the air cart 12 may include a system for measuring product flow to the agricultural implement 10. In certain embodiments, the product flow measurement system includes a first pressure sensor configured to output a first signal indicative of fluid pressure within an upstream portion of a fluid conduit, and a second pressure sensor configured to output a second signal indicative of fluid pressure within a downstream portion of the fluid conduit. The fluid conduit is configured to convey product to the agricultural implement via an air flow in a downstream direction. The product flow measurement system also includes an air flow sensor configured to output a third signal indicative of a flow rate of the air flow, and a fourth signal indicative of a velocity of the air flow. A controller, communicatively coupled to the first pressure sensor, to the second pressure sensor, and to the air flow sensor, is configured to determine a pressure drop between the upstream and downstream portions of the fluid conduit based on the first signal and the second signal. The controller is also configured to determine a mass flow rate of product through the fluid conduit based on the pressure drop, the third signal and the fourth signal. In certain embodiments, the controller is configured to compute the mass flow rate of the product based on the pressure drop, the third signal, the fourth signal, and at least one empirical parameter associated with the product.

Because the mass flow rate of product to the agricultural implement 10 is determined based on measured parameters, the process of manually calibrating the metering system prior to operation is obviated. For example, to manually calibrate a metering system, a user may attach a bag to the metering system to collect expelled product. The user may then instruct the metering system to rotate the meter rollers through a desired number of rotations (e.g., 50 100, 150, 200, etc.). Next, the user may weigh the collected product and enter the weight into a user interface. A controller may then automatically compute a calibration that associates product mass flow rate with rotation of the meter rollers. Such user intervention may be time consuming, and may result in inaccurate calibrations, thereby causing too much or too little product to be delivered. In contrast, the product flow measurement system described below is configured to automatically determine the product mass flow rate during operation of the implement, thereby obviating the calibration procedure. In addition, because the product flow measurement system is configured to determine the product mass flow rate via measured parameters, product (e.g., seed, fertilizer, etc.) within the air cart 12 may be interchanged without recalibrating the metering system.

In certain embodiments, the controller is configured to adjust product flow to the agricultural implement based on the determined product mass flow rate. For example, the controller may be configured to instruct the metering system to control a rotation rate of the meter rollers to adjust the product flow. By way of example, an operator may input a desired product flow rate into a user interface. The controller may then determine the actual mass flow rate of product to the implement based on the measured parameters. Next, the controller may increase or decrease the rotation rate of the meter rollers to provide the desired product mass flow rate to the implement. In further embodiments, the controller may be configured to instruct the air source to adjust the air flow based on the determined mass flow rate of product, the measured mass flow rate of the air flow, and/or the measured velocity of the air flow. For example, the controller may be configured to instruct the air source to increase the air flow if the measured air flow velocity is less than a lower threshold value, and to decrease the air flow if the measured air flow velocity is greater than an upper threshold value. In this manner, sufficient air flow may be provided to substantially reduce the possibility of blockage formation within the product distribution hoses. In addition, the air flow may be limited to substantially reduce the possibility of product being blown out of a seeding trench.

Figure 2:
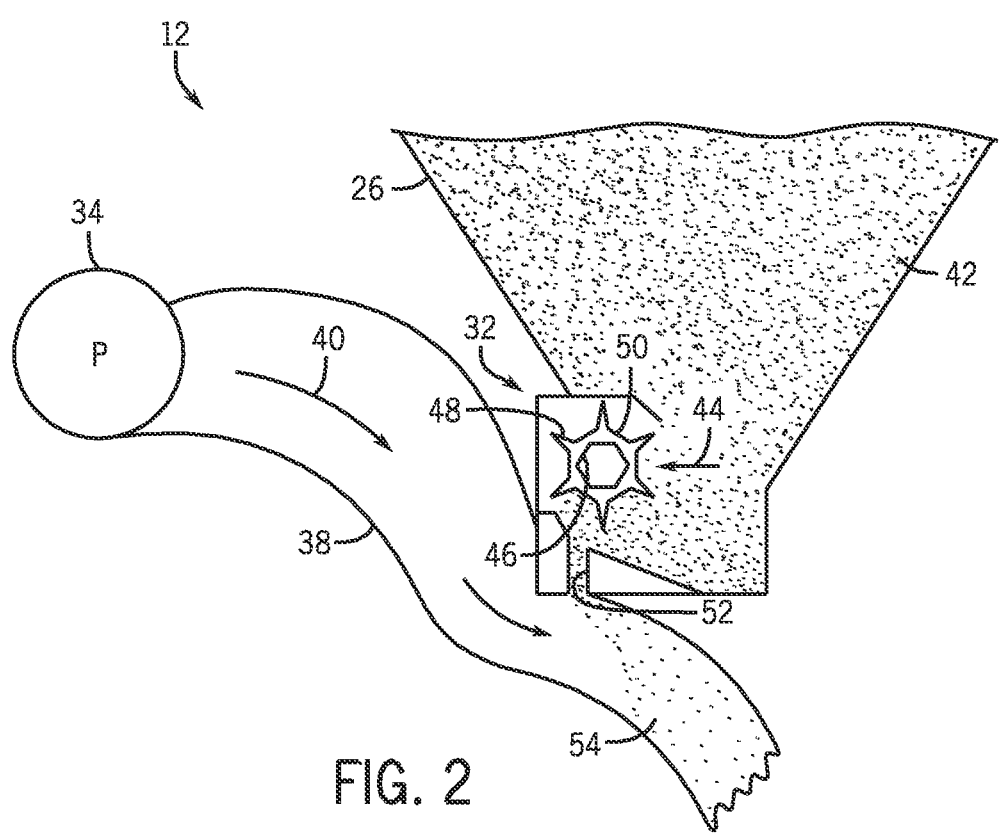
FIG. 2 is a schematic diagram of an exemplary product delivery system that may be used within the air cart of FIG. 1.

FIG. 2 is a schematic view of a product delivery system, such as the illustrated metering system 32, that may be used within the air cart of FIG. 1. As illustrated, the air source 34 is coupled to a conduit 38 extending to the hose 36, and configured to flow air 40 past the metering system 32. The air source 34 may be a pump or blower powered by an electric or hydraulic motor, for example. Flowable particulate product 42 (e.g., seed, fertilizer, etc.) within the storage tank 26 flows by gravity into the metering system 32. The metering system 32 includes one or more meter rollers 44 configured to regulate the flow of product 42 into the air flow 40. More particularly, the metering system 32 may include multiple meter rollers 44 disposed adjacent to one another along a longitudinal axis of the rollers 44. For example, certain metering systems 32 include seven meter rollers 44. Such systems 32 are known as "7-run" metering assemblies. However, alternative embodiments may include more or fewer meter rollers 44, e.g., 5, 6, 7, 8, 9, or more. Further embodiments may include one continuous meter roller 44.

Each meter roller 44 includes an interior cavity 46 configured to receive a shaft that drives the meter roller 44. In the present embodiment, the cavity 46 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 44. Alternatively, the meter rollers 44 may be coupled to a wheel 30 by a gear assembly such that rotation of the wheel 30 drives the meter rollers 44 to rotate. Such a configuration will automatically vary the rotation rate of the meter rollers 44 based on the speed of the air cart 12.

Each meter roller 44 also includes multiple flutes 48 and recesses 50. The number and geometry of the flutes 48 are particularly configured to accommodate the product 42 being distributed. The illustrated embodiment includes six flutes 48 and a corresponding number of recesses 50. Alternative embodiments may include more or fewer flutes 48 and/or recesses 50. For example, the meter roller 44 may include 1, 2, 3, 4, 5, 6, 7, 8, 9, 10, or more flutes 48 and/or recesses 50. In addition, the depth of the recesses 50 and/or the height of the flutes 48 are configured to accommodate the product 42 within the storage tank 26. For example, a meter roller 44 having deeper recesses 50 and fewer flutes 48 may be employed for larger seeds, while a meter roller 44 having shallower recesses 50 and more flutes 48 may be employed for smaller seeds. Other parameters such as flute pitch (i.e., rotation relative to a longitudinal axis) and flute angle (i.e., rotation relative to a radial axis) may also be varied in alternative embodiments.

For a particular meter roller configuration, the rotation rate of the meter roller 44 controls the flow of product 42 into the air stream 40. Specifically, as the meter roller 44 rotates, product is transferred through an opening 52 in the metering system 32 into the conduit 38. The product then mixes with air from the air source 34, thereby forming an air/product mixture 54. The mixture then flows to the ground engaging tools 16 of the implement 10 via the hose 36, where the seeds and/or fertilizer are deposited within the soil. While the illustrated embodiment utilizes a meter roller 44 to supply product to the air stream 40, it should be appreciated that alternative embodiments may employ other devices, such as an auger, to regulate the flow of product to the conduit 38.

As discussed in detail below, the air cart 12 may include a product flow rate measurement system configured to determine a mass flow rate of the product into the air stream. For example, in certain embodiments, the product flow rate measurement system includes a controller configured to determine a mass flow rate of product through the fluid conduit 38 based on a pressure drop between an upstream portion and a downstream portion of the fluid conduit, a mass flow rate of the air flow, and a velocity of the air flow. Because the mass flow rate of product to the agricultural implement 10 is determined based on measured parameters, the process of manually calibrating the metering system prior to operation is obviated. In addition, the controller may be configured to adjust the product flow to the agricultural implement based on the determined product mass flow rate. In such configurations, a measured quantity of product may be supplied to the implement, thereby establishing a desired distribution of product across the field.

Figure 3:
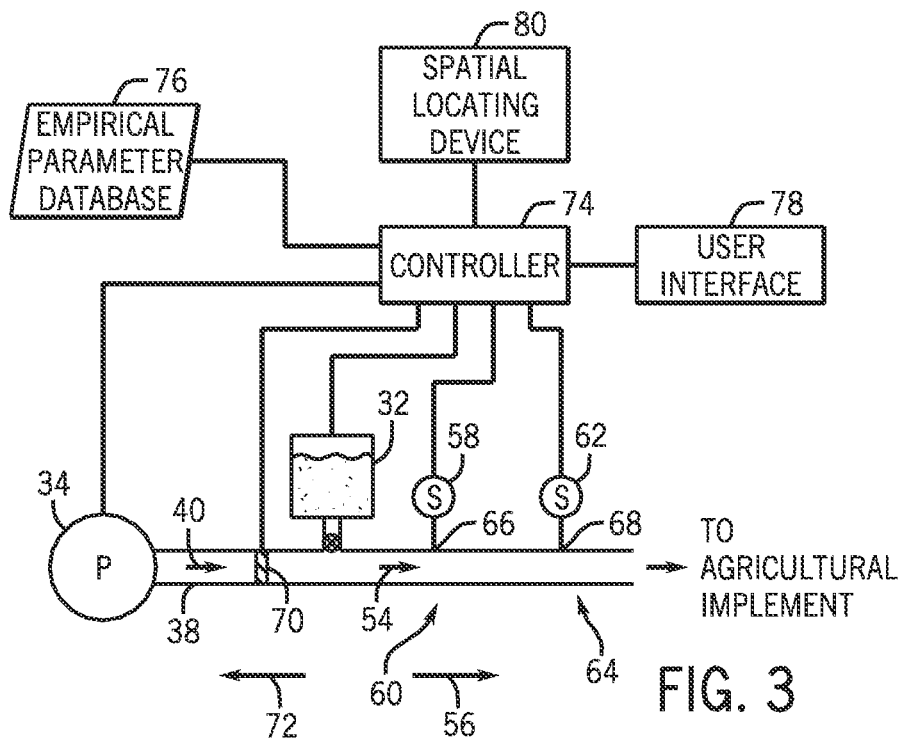
FIG. 3 is a schematic diagram of an embodiment of a product flow measurement system that may be used within the air cart of FIG. 1.

FIG. 3 is a schematic diagram of an embodiment of a product flow measurement system that may be used within the air cart of FIG. 1. As previously discussed, the air source 34 is configured to provide an air flow 40 into the fluid conduit 38. In addition, the metering system 32 is configured to deliver product into the air flow 40, thereby establishing a product/air mixture that flows in a downstream direction 56 toward the implement 10. In the illustrated embodiment, air cart 12 includes a product flow measurement system configured to determine a mass flow rate of product through the fluid conduit 38. As illustrated, the product flow measurement system includes a first pressure sensor 58 configured to measure fluid pressure within an upstream portion 60 of the fluid conduit, and a second pressure sensor 62 configured to measure fluid pressure within a downstream portion 64 of the fluid conduit 38. The first pressure sensor 58 is fluidly coupled to the conduit 38 via a first pressure tap 66, and the second pressure sensor 62 is fluidly coupled to the conduit 38 via a second pressure tap 68. The sensors 58 and 62 are configured to measure the fluid pressure within the conduit 38 via the respective pressure taps, and to output respective signals indicative of the measured pressure. As will be appreciated, the first and sensor pressure sensors may include fiber optic sensors, mechanical deflection sensors, piezoelectric sensors, microelectromechanical system (MEMS) sensors, or any other suitable sensor configured to output a signal indicative of fluid pressure within the conduit 38.

The product flow measurement system also includes an air flow sensor 70 positioned upstream (i.e., along an upstream direction 72) of metering system 32. The air flow sensor 70 is configured to measure a flow rate of the air flow 40, and a velocity of the air flow 40. In certain embodiments, the air flow sensor 70 includes an orifice plate having an aperture with a smaller diameter than the fluid conduit 38. As the air flow 40 passes through the aperture, the fluid pressure decreases and the velocity increases. By measuring the pressure difference between the air flow upstream and downstream of the aperture, the flow rate (e.g., volumetric flow rate, mass flow rate, etc.) of air flow 40 may be determined. In further embodiments, the air flow sensor 70 includes a hot wire sensor having an electrically heated element extending through the air flow. As will be appreciated, heat transfer from the wire to the air flow is at least partially dependent on the flow rate of the air flow across the wire. Therefore, by measuring the electrical current sufficient to heat the wire to a desired temperature, the flow rate of air flow 40 may be determined. In addition, the air flow sensor 70 may include a pitot tube configured to measure both static and dynamic pressures within the fluid conduit 38. By comparing the static and dynamic pressures, the flow rate of the air flow 40 may be determined. As will be appreciated, if a volumetric flow rate is measured, the mass flow rate may be calculated based on the density of the air. Furthermore, it should be appreciated that the orifice plate, the hot wire sensor and the pitot tube may be employed to measure the velocity of the air flow 40. It should also be appreciated that alternative embodiments may include other suitable air flow sensors configured to measure flow rate and/or velocity of the air flow 40.

In the illustrated embodiment, the first pressure sensor 58, the second pressure sensor 62 and the air flow sensor 70 are communicatively coupled to a controller 74. The controller 74 is configured to receive a first signal from the first pressure sensor 58 indicative of fluid pressure within the upstream portion 60 of the fluid conduit 38, and to receive a second signal from the second pressure sensor 62 indicative of fluid pressure within the downstream portion 64 of the fluid conduit 38. The controller 74 is also configured to receive a third signal from the air flow sensor 70 indicative of a flow rate of air flow 40, and a fourth signal from the air flow sensor 70 indicative of a velocity of the air flow. Alternatively, the controller 74 may be configured to receive the third signal or the fourth signal, and to determine both the mass flow rate of the air flow and the velocity of the air flow based on the single signal. Once the signals have been received, the controller 74 may determine a pressure drop between the upstream and downstream portions of the conduit 38 based on the first and second signals. The controller 74 may then determine a mass flow rate of product through the fluid conduit based on the pressure drop, the mass flow rate of the air flow and the velocity of the air flow. Because the mass flow rate of product to the agricultural implement 10 is determined based on measured parameters, the time associated with performing a manual calibration process prior to operation of the implement may be substantially reduced or eliminated.

While the illustrated embodiment includes separate pressure sensors 58 and 62, it should be appreciated that alternative embodiments may include a single pressure sensor configured to directly measure the pressure drop between the upstream and downstream portions of the fluid conduit 38. For example, in certain embodiments, a differential pressure sensor may be fluidly coupled to the first pressure tap 66, and to the second pressure tap 68. In such embodiments, the differential pressure sensor may be configured to output a signal indicative of the pressure difference (i.e., pressure drop) between the upstream portion 60 of the fluid conduit 38 and the downstream portion 64 of the fluid conduit 38. Accordingly, the controller 74 may determine the product mass flow rate based on the differential pressure signal.

In certain embodiments, the controller 74 may be configured to establish a relationship between the measured parameters (i.e., flow rate of the air flow, velocity of the air flow, and pressure drop through the fluid conduit) and the mass flow rate of product through the fluid conduit based on empirically derived parameters. For example, at least one empirical parameter may be associated with each product (e.g., seed, fertilizer, etc.), and the controller 74 may be configured to determine the mass flow rate of product through the fluid conduit 38 based on the pressure drop, the mass flow rate of the air flow, the velocity of the air flow, and the empirical parameters. The empirical parameters may be stored in an empirical parameter database 76, which includes a list of products and a corresponding list of empirical parameters. By way of example, prior to operation of the implement 10, an operator may select the type of product (e.g., seed, fertilizer, etc.) stored within the tank 26 of the air cart 12 via a user interface 78. The controller 74, in turn, may select the appropriate empirical parameters from the database 76 based on the selected product. During operation of the implement, the controller 74 may determine the mass flow rate of product to the implement 10 based on the pressure drop, the flow rate of the air flow, the velocity of the air flow, and the empirical parameters associated with the product flowing to the ground engaging tools 16.

In certain embodiments, the controller 74 is configured to determine the product mass flow rate based on a table of values associated with a particular product. For example, once the appropriate empirical parameters are selected, the controller may establish a table that provides a relationship between the measured pressure drop, the flow rate of the air flow, the velocity of the air flow, and the mass flow rate of product to the implement 10. Once the table is established, the controller 74 may determine the mass flow rate of product based on the measured parameters during operation of the implement 10.

In further embodiments, the controller 74 is configured to determine the mass flow rate of product based on a computation involving pressure drop, mass flow rate of the air flow, velocity of the air flow, and the empirical parameters. For example, in certain embodiments, product mass flow rate may be determined by the following equation:

$$m_p = m_a \cdot [(a_1 e^{a_2 v}) \Delta p - \ln(b_1 v^3 + b_2 v^2 + b_3 v + b_4)]$$

where $m_p$ is the mass flow rate of product through the fluid conduit, $m_a$ is the mass flow rate of the air flow, $\Delta_p$ is the pressure drop through the conduit, v is the velocity of the air flow, and $a_1$, $a_2$, $b_1$, $b_2$, $b_3$ and $b_4$ are empirical parameters. In such embodiments, the controller 74 may compute the mass flow rate of product through the conduit based on the selected empirical parameters and the measured values. While the equation presented above provides an accurate determination of product mass flow rate through certain agricultural systems, it should be appreciated that alternative systems may utilize other equations to compute product mass flow rate based on the pressure drop, the mass flow rate of the air flow, the velocity of the air flow, and certain empirical parameters.

As discussed in detail below, the parameters $a_1$, $a_2$, $b_1$, $b_2$, $b_3$ and $b_4$ may be empirically determined by correlating a measured pressure drop, a mass flow rate of the air flow and a velocity of the air flow with particular product mass flow rates. Alternatively, the parameters may be determined based on physical properties of the product. For example, the parameters may be computed via a mathematical model that utilizes the mass of each product particle, the shape of each product particle, the surface friction of each product particle and/or other physical properties to determine the parameters.

In addition, while the product flow measurement system described above is configured to determine the product mass flow rate based on the measured pressure drop, the mass flow rate of the air flow, and the velocity of the air flow, it should be appreciated that alternative product flow measurement systems may be configured to receive additional parameters to facilitate determination of the product mass flow rate. For example, the product flow measurement system may include additional sensors configured to measure a temperature of the air flow, a pressure of the air flow and/or a relative humidity of the air flow, among other parameters. In such a configuration, the controller 74 may be configured to determine the product mass flow rate based on the measured pressure drop, the mass flow rate of the air flow, the velocity of the air flow, and the additional measured parameters.

In certain embodiments, the controller 74 is configured to adjust product flow to the agricultural implement based on the determined mass flow rate of product. For example, in the illustrated embodiment, the controller 74 is communicatively coupled to the metering system 32, and configured to instruct the metering system to adjust product flow to the conduit 38 based on the determined mass flow rate of product. By way of example, if the controller 74 determines that the mass flow rate of product is lower than desired, the controller 74 may instruct the metering system 32 to increase the meter roller rotation rate to increase product flow into the air stream 40. Conversely, if the controller 74 determines that the mass flow rate of product is higher than desired, the controller 74 may instruct the metering system 32 to decrease the meter roller rotation rate to decrease product flow into the air stream 40. In this manner, controller 74 may maintain a desired flow rate of product to the ground engaging tools 16 of the implement 10.

Furthermore, in the illustrated embodiment, the controller 74 is communicatively coupled to the air source 34, and configured to instruct the air source to adjust the air flow based on the determined mass flow rate of product, the measured flow rate of the air flow and/or the measured velocity of the air flow. For example, the controller 74 may be configured to establish a suitable range of air flows (e.g., between a lower threshold value and an upper threshold value) based on the determined mass flow rate of product. By way of example, the controller 74 may establish a lower range of air flows while less product is flowing through the conduit 38, and a higher range of air flows while more product is flowing through the conduit 38. In this manner, the air flow may be particularly selected to facilitate product flow from the metering system 32 to the implement 10. Once the desired range of air flows is established, the controller 74 may instruct the air source 34 to increase the air flow if the measured air flow velocity is less than the lower threshold value, and to decrease the air flow if the measured air flow velocity is greater than the upper threshold value. As a result, sufficient air flow may be provided to substantially reduce the possibility of blockage formation within the product distribution hoses. In addition, the air flow may be limited to substantially reduce the possibility of product being blown out of a seeding trench.

By way of example, prior to operation, an operator may input a product type into the user interface 78. For example, the operator may select between a variety of seeds (e.g., canola, wheat, chickpea, etc.) and/or fertilizers. The controller 74 may then select the appropriate empirical parameters from the empirical parameter database 76 based on the product selection. Next, the controller 74 may establish a relationship between the mass flow rate of product and the measured pressure drop, the flow rate of the air flow, and the velocity of the air flow based on the selected empirical parameters. The operator may then enter a desired product coverage density (e.g., in terms of mass per acre) into the user interface 78.

In certain embodiments, the desired product coverage density may be automatically selected based on implement position. For example, in the illustrated embodiment, a spatial locating device 80 (e.g., global positioning system (GPS) receiver) is communicatively coupled to the controller 74, and configured to output a signal indicative of implement/air cart position. As will be appreciated, the spatial locating device 80 may be coupled to the implement 10, to the air cart 12, or to any other suitable location (e.g., tow vehicle, etc.). By adjusting the target product coverage density based on implement position, product may be applied to the field more efficiently than an even product distribution.

Once the product coverage density is selected, the controller 74 may determine a target product mass flow rate based on the speed of the implement 10. For example, if the desired coverage density is one kilogram per acre, and the implement traverses one acre in 10 seconds, the controller 74 will establish a target mass flow rate about 0.1 kg/s. As will be appreciated, the speed of the implement may be measured by a speedometer on the implement 10, the air cart 12, or the tow vehicle. Alternatively, the ground speed may be measured by the spatial locating device 80.

The controller 74 may then measure the mass flow rate of product to the implement 10 based on the pressure drop, the mass flow rate of the air flow, the velocity of the air flow, and the selected empirical parameters. If the determined mass flow rate of product is higher than the target value, the controller 74 will instruct the metering system 32 to reduce the rotation rate of the meter rollers. Conversely, if the determined mass flow rate of product is lower than the target value, the controller 74 will instruct the metering system 32 to increase the rotation rate of the meter rollers. The controller 74 will also determine the desired air flow range based on the measured mass flow rate of product, and adjust the blower speed such that the resultant air flow is within the desired range. Consequently, the implement will provide a desired quantity of product to the field, while obviating the time consuming calibration procedure.

While the product flow measurement system is described above with reference to an air cart 12, it should be appreciated that the product flow measurement system may be employed within any suitable agricultural system configured to convey product to a ground engaging tool via an air flow. For example, in certain embodiments, the product flow measurement system may be utilized within a self-contained vehicle having a product distribution system and ground engaging tools configured to receive product from the product distribution system via an air flow. It should also be appreciated that the product flow measurement system may be distributed between an air cart 12 and an implement 10. For example, in certain embodiments, the air flow sensor 70 may be coupled to the air cart 12, and the first and second pressure sensors 58 and 62 may be coupled to the implement 10. In such embodiments, the implement may include multiple sets of pressure sensors to measure the pressure drop to each ground engaging tool, or group of ground engaging tools. The mass flow rate to each tool, or group of tools, may then be determined based on the respective pressure drop.

Figure 4:
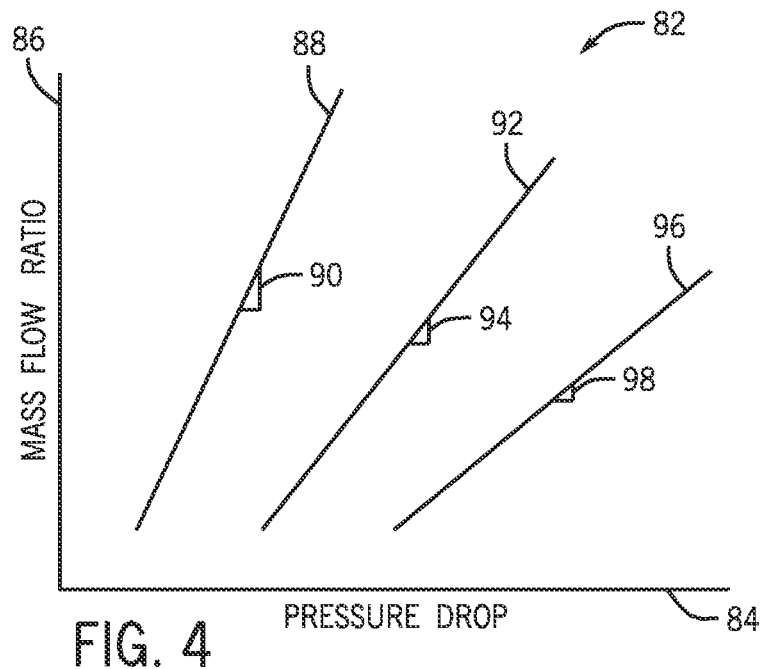
FIG. 4 is an exemplary graph of mass flow ratio versus pressure drop.

FIG. 4 is an exemplary graph 82 of mass flow ratio versus pressure drop. As illustrated, a horizontal axis 84 represents pressure drop, a vertical axis 86 represents mass flow ratio, and a first curve 88 represents an exemplary relationship between mass flow ratio and pressure drop at a first air flow velocity. In the illustrated embodiment, the mass flow ratio is the ratio of the product mass flow rate to the mass flow rate of the air flow. As illustrated by the first curve 88, the mass flow ratio increases as the pressure drop increases. Consequently, a relationship may be established between mass flow ratio and pressure drop for a particular air flow velocity. For example, in the illustrated embodiment, the first curve 88 is substantially linear, and has a first slope 90. Based on this curve, if the velocity of the air flow into the fluid conduit and the pressure drop are measured, the mass flow ratio may be determined. The mass flow rate of product may then be determined based on the mass flow ratio and the mass flow rate of the air flow.

The graph 82 also includes a second curve 92 having a second slope 94, and a third curve 96 having a third slope 98. The second curve 92 represents the relationship between mass flow ratio and pressure drop for a second air flow velocity, and the third curve 96 represents the relation between mass flow ratio and pressure drop for a third velocity. In the illustrated embodiment, the second velocity is greater than the first velocity, and the third velocity is greater than the second velocity. Accordingly, for a particular mass flow ratio, pressure drop increases as air flow velocity increases. In addition, the slope of the curves decreases as velocity increases. Based on this series of curves, a two-dimensional relationship between mass flow ratio, pressure drop and air flow velocity may be established.

By way of example, to generate the series of curves, a product (e.g., seed, fertilizer, etc.) may be loaded into the tank 26 of an exemplary air cart 12. The metering system 32 may then be calibrated to establish a relationship between meter roller rotation and product mass flow rate. The air flow velocity and the product mass flow rate may be independently varied (e.g., via varying blower speed and varying meter roller rotation rate), and the pressure drop, the air flow velocity and the mass flow rate of the air flow may be measured. Once the relationship between the pressure drop, the mass flow rate of the air flow, the velocity of the air flow, and the mass flow rate of product is established, a table may be generated that enables the controller 74 to determine product mass flow rate during operation of the implement based on the measured parameters. Alternatively, empirical parameters may be generated to facilitate computation of the product mass flow rate based on an empirical equation, such as the equation described above.

As will be appreciated, the series of curves may vary (e.g., slope, y-intercept, etc.) based on product. Therefore, a table and/or a series of empirical parameters may be generated for each product that may be distributed by the air cart 12. These tables and/or empirical parameters may be stored in a database, thereby enabling an operator to select the appropriate table/empirical parameters for a particular product. Furthermore, while linear curves are shown in the illustrated graph 82, it should be appreciated that alternative relationships between mass flow ratio and pressure drop may be defined in alternative embodiments. In addition, it should be appreciated that the relationship between mass flow ratio and pressure drop may vary based on physical parameters of the air cart 12/implement 10. For example, elevations changes, bends within the conduit 38 and/or variations in surface roughness may affect the measured pressure drop. Consequently, a series of curves may be generated for each air cart configuration, thereby enhancing the accuracy of product mass flow rate determination.

Figure 5:
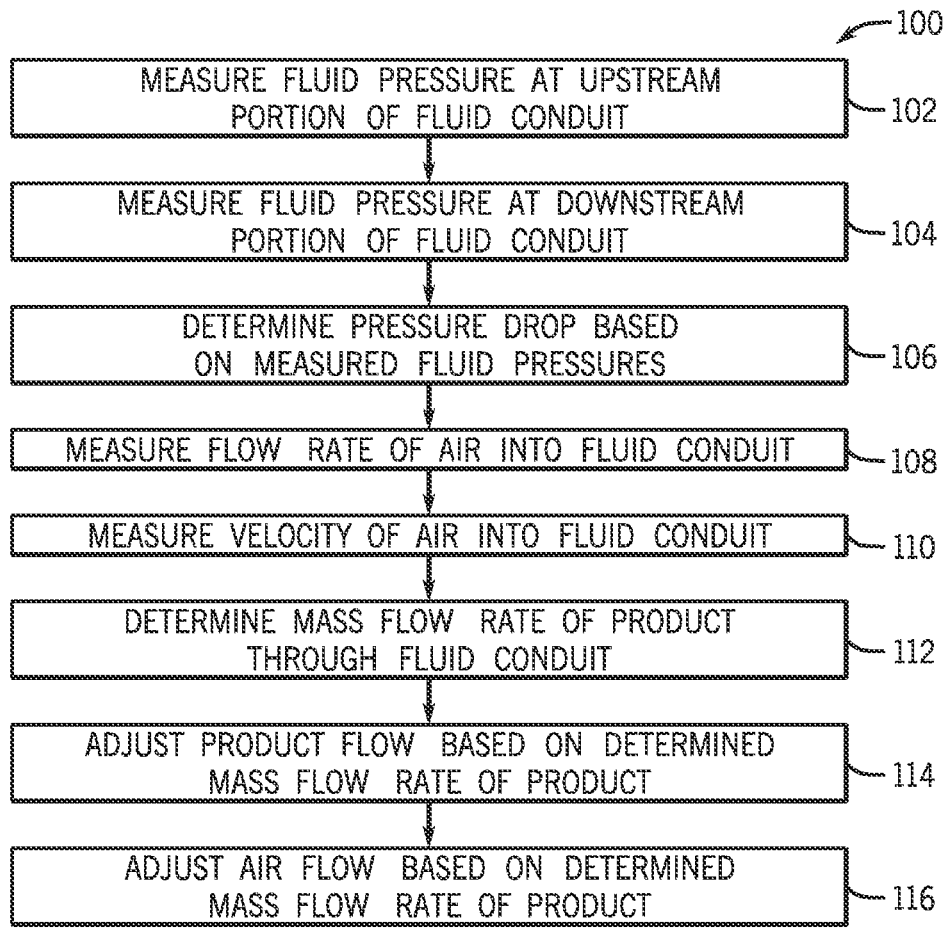
FIG. 5 is a flowchart of an exemplary method for measuring and controlling product flow to an agricultural implement.

FIG. 5 is a flowchart of an exemplary method 100 for measuring and controlling product flow to an agricultural implement. First, as represented by block 102, fluid pressure within an upstream portion of the fluid conduit 38 is measured. Next, fluid pressure within a downstream portion of the fluid conduit 38 is measured, as represented by block 104. For example, the fluid pressure may be measured by pressure sensors fluidly coupled to the conduit 38. A pressure drop between the upstream portion and the downstream portion of the fluid conduit is then determined, as represented by block 106. For example, the controller 74 may compare signals output from the pressure sensors to determine the pressure drop along the conduit 38. Next, as represented by block 108, a flow rate of the air flow is measured, and a velocity of the air flow is measured, as represented by block 110. In certain embodiments, an air flow sensor, positioned upstream of the metering system, may be configured to measure the flow rate and velocity of the air flow, and to output signals indicative of the measured parameters to the controller 74. A mass flow rate of product through the fluid conduit is then determined based on the pressure drop, the mass flow rate of the air flow, and the velocity of the air flow, as represented by block 112.

Product flow to the implement is adjusted based on the determined mass flow rate of product, as represented by block 114. For example, if the controller 74 determines that the mass flow rate of product is lower than desired, the controller 74 may instruct the metering system 32 to increase the meter roller rotation rate to increase product flow into the air stream 40. Conversely, if the controller 74 determines that the mass flow rate of product is higher than desired, the controller 74 may instruct the metering system 32 to decrease the meter roller rotation rate to decrease product flow into the air stream 40. Finally, as represented by block 116, the air flow into the fluid conduit 38 is adjusted based on the determined mass flow rate of product. Consequently, a sufficient air flow may be provided to substantially reduce the possibility of blockage formation within the product distribution hoses. In addition, the air flow may be limited to substantially reduce the possibility of product being blown out of a seeding trench.

Figure 6:
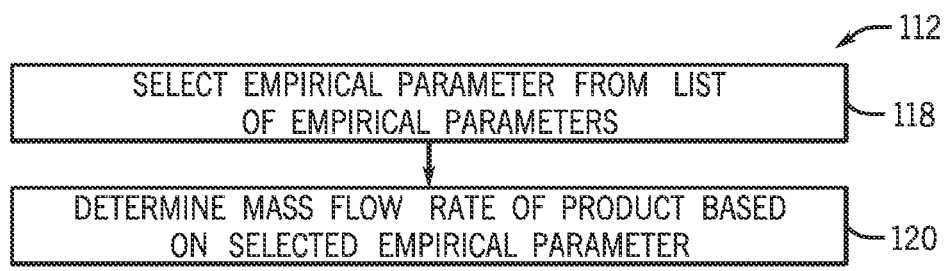
FIG. 6 is a flowchart of an exemplary method for determining a mass flow rate of product through a fluid conduit.

FIG. 6 is a flowchart of an exemplary method 112 for determining a mass flow rate of product through a fluid conduit. First, as represented by block 118, an empirical parameter is selected from a list of empirical parameters based on the type product. The mass flow rate of product is then determined based on the selected empirical parameter, as represented by block 120. For example, the controller 74 may be configured to determine the mass flow rate of product flowing through the conduit 38 based on a table of values associated with a particular product. Alternatively, the controller 74 may be configured to determine the mass flow rate of product based on a computation involving pressure drop, flow rate of the air flow, velocity of the air flow, and the empirical parameters. Because the mass flow rate of product to the agricultural implement 10 is determined based on measured parameters, the process of manually calibrating the metering system prior to operation is obviated.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for measuring product flow to an agricultural implement, comprising:
   a first pressure sensor configured to output a first signal indicative of fluid pressure within an upstream portion of a fluid conduit, wherein the fluid conduit is configured to convey product to the agricultural implement via an air flow in a downstream direction;
   a second pressure sensor configured to output a second signal indicative of fluid pressure within a downstream portion of the fluid conduit;
   an air flow sensor configured to output a third signal indicative of a flow rate of the air flow, and a fourth signal indicative of a velocity of the air flow; and
   a controller communicatively coupled to the first pressure sensor, to the second pressure sensor, and to the air flow sensor, wherein the controller is configured to determine a pressure drop between the upstream and downstream portions of the fluid conduit based on the first signal and the second signal, and the controller is configured to determine a mass flow rate of the product based on the pressure drop, the third signal, and the fourth signal,
   wherein all signals are conveyed to the controller when product is in the fluid conduit, and
   wherein at least a portion of the product is a particulate.

2. The system of claim 1, wherein the controller is configured to determine the mass flow rate of the product based on the pressure drop, the third signal, the fourth signal, and at least one empirical parameter associated with the product.

3. The system of claim 2, wherein the mass flow rate of the product is determined according to the equation:

$$m_p = m_a \cdot [(a_1 e^{a_2 v})\Delta p - \ln(b_1 v^3 + b_2 v^2 + b_3 v + b_4)]$$

where $m_p$ is the mass flow rate of the product, $m_a$ is a mass flow rate based on the flow rate of the air flow, $\Delta p$ is the pressure drop, v is the velocity of the air flow, and $a_1$, $a_2$, $b_1$, $b_2$, $b_3$ and $b_4$ are empirical parameters.

4. The system of claim 2, wherein the controller is configured to select the at least one empirical parameter from a list of empirical parameters based on a fifth signal indicative of a selected product.

5. The system of claim 4, comprising a user interface communicatively coupled to the controller, and configured to output the fifth signal based on user input.

6. The system of claim 1, wherein the air flow sensor is positioned upstream of a region in which the product is supplied to the fluid conduit.

7. The system of claim 1, wherein the first pressure sensor, the second pressure sensor, or a combination thereof, is configured to fluidly couple to the fluid conduit via a pressure tap extending through the fluid conduit.

8. The system of claim 1, wherein the air flow sensor comprises at least one of a hot wire sensor, an orifice plate, a pitot tube, or a combination thereof.

9. The system of claim 1, wherein the product comprises a particulate including seed, granular fertilizer, or a combination thereof.

10. The system of claim 1, wherein the fluid conduit is configured to convey the product from an air cart to the agricultural implement.

* * * * *